United States Patent
Morsky et al.

(10) Patent No.: US 7,354,559 B2
(45) Date of Patent: Apr. 8, 2008

(54) CRYSTALLIZATION APPARATUS AND METHOD FOR THE FORMATION OF CRYSTALS IN A SUCH APPARATUS

(75) Inventors: Esa Morsky, Tolkkinen (FI); Jarmo Louhelainen, Kerava (FI)

(73) Assignee: Borealis Technology Oy, Porvoo (FI)

( * ) Notice: Subject to any disclaimer, the term of this patent is extended or adjusted under 35 U.S.C. 154(b) by 130 days.

(21) Appl. No.: 10/501,079

(22) PCT Filed: Jan. 8, 2003

(86) PCT No.: PCT/FI03/00008

§ 371 (c)(1),
(2), (4) Date: Apr. 15, 2005

(87) PCT Pub. No.: WO03/057341

PCT Pub. Date: Jul. 17, 2003

(65) Prior Publication Data

US 2005/0229363 A1  Oct. 20, 2005

(30) Foreign Application Priority Data

Jan. 9, 2002 (FI) .................................. 20020033

(51) Int. Cl.
*B01D 9/00* (2006.01)

(52) U.S. Cl. .................................................. 422/245.1
(58) Field of Classification Search .............. 422/245.1
See application file for complete search history.

(56) References Cited

U.S. PATENT DOCUMENTS

| 3,175,299 | A | * | 3/1965 | Boucher ....................... 34/279 |
| 5,215,949 | A | | 6/1993 | Pentii et al. |
| 5,476,824 | A | | 12/1995 | Jokinen et al. |
| 6,444,181 | B1 | * | 9/2002 | Setzer et al. ............. 422/245.1 |
| 2002/0131923 | A1 | | 9/2002 | Acton |

FOREIGN PATENT DOCUMENTS

| EP | 0 054 328 | | 6/1982 |
| EP | 54328 A1 | * | 6/1982 |
| EP | 0 424 049 | | 4/1991 |
| EP | 0 655 073 | | 5/1995 |
| EP | 1 088 586 | | 4/2001 |
| WO | WO 98/53926 | | 12/1998 |
| WO | 00/79095 | | 12/2000 |

* cited by examiner

*Primary Examiner*—Robert B. Davis
*Assistant Examiner*—Marissa W. Chaet
(74) *Attorney, Agent, or Firm*—Young & Thompson

(57) ABSTRACT

The invention relates to a chamber for the crystallization of solid catalyst carrier. The chamber is provided with an acoustic generator (9) for loosening the carrier from the walls of the chamber.

7 Claims, 1 Drawing Sheet

CRYSTALLIZATION APPARATUS AND METHOD FOR THE FORMATION OF CRYSTALS IN A SUCH APPARATUS

FIELD OF THE INVENTION

The invention relates to the preparation of solid catalyst carriers by crystallization, and concerns crystallization chambers, methods for the crystallization of the carrier, and methods for removing the carrier from the crystallization chamber.

BACKGROUND OF THE INVENTION

Polymerization catalysts, such as Ziegler-Natta type catalysts, are usually deposited on solid carrier particles. The chemical composition, the structure of the surface, the morphology, and the size of the particles are important for the activity of the catalyst and for the properties of the polymer to be produced.

Certain carriers, such as $MgCl_2*(ROH)_n$, in which R is an alkyl group and n is 1 to 6, are prepared by melting the substance and then crystallizing the melt in a spraying chamber. The crystallized particles are screened in order to remove too small and too big particles. The melt may be sprayed e.g. through a rotating nozzle, as described in EP 655 073. One problem in such processes is that the carrier tends to stick and agglomerate on the walls of the chamber. This decreases the yield and quality of the carrier. Pneumatic hammers have been used for removing the carrier from the walls. This has, however, not been very effective. Hammering also easily damages the chamber.

SUMMARY OF THE INVENTION

Now a chamber for the preparation catalyst carrier by crystallization, a method for preparing such carrier in a chamber, and a method for removing such carrier from a chamber have been invented in accordance with the independent claims. Some preferable embodiments of the invention are described in the dependent claims.

In accordance with the invention, the chamber is provided with an acoustic generator, which produces a strong sound, which loosens the material from the walls of the chamber. The intensity of the sound may be e.g. 100 to 150 dB, preferably 120 to 140 dB, and most preferably 130 to 135 dB. The frequency of the sound is suitably over 5 Hz and below 20000 Hz, i.e. broadly at the audible range and below the ultrasonic range. Most suitably the frequency is below 10000 Hz. Preferably the range is 20 to 5000 Hz, more preferably 100 to 1000 Hz, and most preferably 400 to 600 Hz. The duration of the sound signal used may be e.g. 1 to 10 seconds, such as 3 to 7 seconds. The generator is preferably used at suitable intervals, e.g. at intervals of 0.2 to 2 minutes, preferably 0.3 to 0.7 minutes.

The acoustic generator may comprise a vibrating metal diaphragm, which is vibrated pneumatically. The generator is usually provided with a horn. The horn should be pointed downwards in the chamber.

The chamber is usually a closed vessel surrounded by walls. The generator is preferably mounted in the top wall of the chamber.

The material is preferably removed from the chamber from its bottom. The chamber is typically an upright cylindrical chamber with a conical bottom. The volume of an industrial full scale chamber is typically 10 to 30 m³, such as 15 to 20 m³.

The carrier may be e.g. a magnesium containing carrier, such as $MgCl_2*(ROH)_n$, in which R is an alkyl group and n is 1 to 6. Such a carrier is used especially for Ziegler-Natta type olefin polymerization catalysts. Silica is another typical carrier material.

In the crystallization chamber, melted material is sprayed into the chamber where it is cooled and crystallized. Cooling gas may be blown into the chamber. The cooling gas is preferably an inert gas, such as nitrogen. According to one embodiment, the melt is fed through a nozzle on the top of the chamber. Cooling gas is also fed on the top of the chamber. Additional cooling gas may be fed on a lower position. The second cooling gas usually has lower temperature.

In accordance with the invention, sticking of the catalyst material on the walls and outlet of the chamber and agglomeration of the catalyst material particles is effectively prevented. This is especially advantageous when the material is removed continuously from the chamber. The fraction of too large particles to be rejected is also thus decreased. The quality of the material is not decreased. No damage is caused to the chamber.

BRIEF DESCRIPTION OF THE DRAWINGS

The enclosed drawings form a part of the written description of the invention.

DETAILED DISCLOSURE OF SOME EMBODIMENTS OF THE INVENTION

Figure 1:
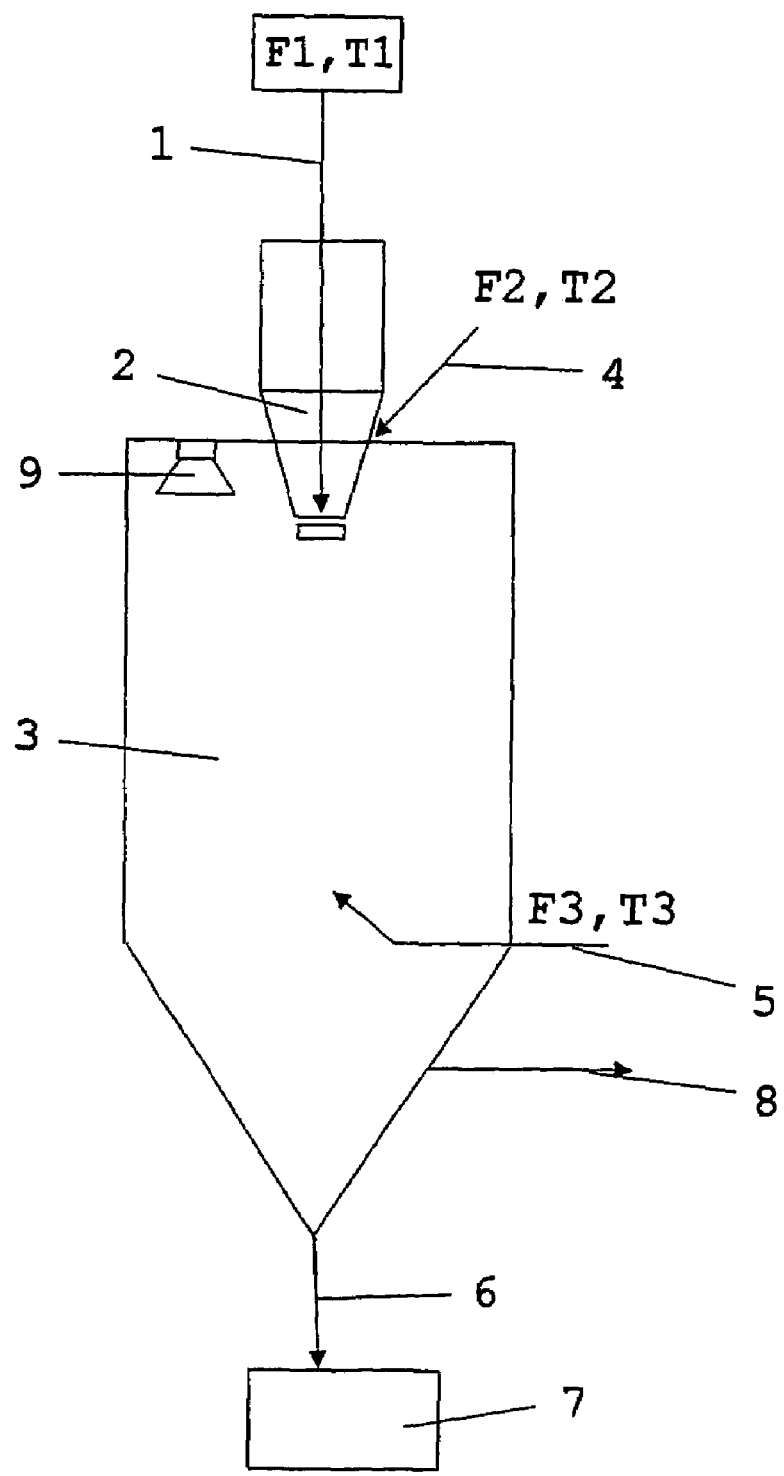
FIG. 1 shows the preparation of a catalyst carrier by a spraying process.

FIG. 1 describes the preparation of a $MgCl_2*(C_2H_5OH)_n$ carrier material. The material is melted and fed through line 1 and nozzle 2 on the top of spraying chamber 3. The flow rate of the melt is F1 and temperature T1. Nitrogen is fed through line 4 on the top of the chamber. The flow rate is F2 and the temperature T2. T2 is lower than T1. A second nitrogen flow is fed through line 5 into the lower part of the chamber just above the conical bottom. The flow rate is F3 and the temperature T3. T3 is lower than T2. The carrier material crystallizes in the chamber and falls at the bottom, from where it is continuously removed through line 6 to screen 7. Gases are removed from the chamber through line 8.

An acoustic generator 9 (Nirafon, Lahti, Finland) is mounted inside the chamber 3 at the top, the horn pointing downwards into the chamber. The generator comprises a vibrating diaphragm at the frequency of 500 Hz. The maximum intensity of the sound is 135 dB. The horn is operated with 7 to 8 bar nitrogen.

The process was run under the following conditions:

| F1 kg/h | T1 °C. | F2 kg/h | T2 °C. | F3 kg/h | T3 °C. |
|---|---|---|---|---|---|
| 25 | 115 | 340 | 64 | 650 | −21 |

The acoustic generator 9 was blown for 5 sec after each 30 sec.

The process could be run without the material blocking the bottom outlet or sheeting the chamber walls. The longest uninterrupted run was 15 days. Even after that no sign of the carrier depositing on the walls or outlet was found.

As a comparison, the acoustic generator 9 was switched off. An immediate small drop in the outlet rate was observed. After 6 hours the outlet was totally blocked and it had to be opened. The run was continued and after 3 hours the outlet was almost totally blocked again. When the acoustic generator was taken in use again, after 15 hours a sudden flood of material was observed. This material had obviously been deposited on the walls of the chamber and was now suddenly dropped.

The invention claimed is:

1. A method for the preparation of solid crystallized catalyst carrier, comprising forming crystallized carrier inside of a chamber, and generating with an acoustic generator disposed within the chamber a sound having an intensity of at least 100 dB and a duration of 1 to 10 seconds for loosening the carrier from the walls of the chamber.

2. A method as claimed in claim 1, in which the sound has a frequency of 20 to 5000 Hz.

3. The method as claimed in claim 1, wherein the sound has a frequency of 100 to 1000 Hz.

4. A method as claimed in claim 1, wherein the sound has a frequency of 400 to 600 Hz.

5. A method as claimed in claim 1, wherein the duration of the sound is 3 to 7 seconds.

6. A method as claimed in claim 1, wherein the sound is generated periodically at intervals of 0.2 to 2 minutes.

7. A method as claimed in claim 1, wherein the sound is generated periodically at intervals of 0.3 to 0.7 minutes.

* * * * *